Oct. 19, 1937.  W. H. FRICK  2,096,631
CONVERTIBLE GAS AND CHARCOAL RANGE
Filed Nov. 7, 1934  7 Sheets-Sheet 1

Oct. 19, 1937.   W. H. FRICK   2,096,631
CONVERTIBLE GAS AND CHARCOAL RANGE
Filed Nov. 7, 1934   7 Sheets-Sheet 4

Oct. 19, 1937.  W. H. FRICK  2,096,631
CONVERTIBLE GAS AND CHARCOAL RANGE
Filed Nov. 7, 1934  7 Sheets-Sheet 5
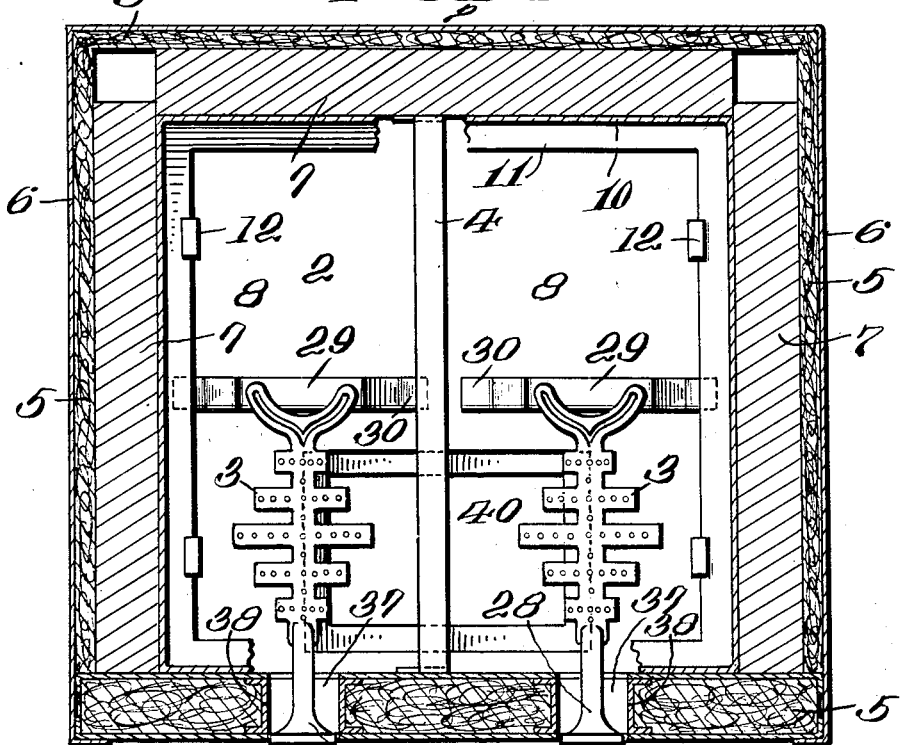
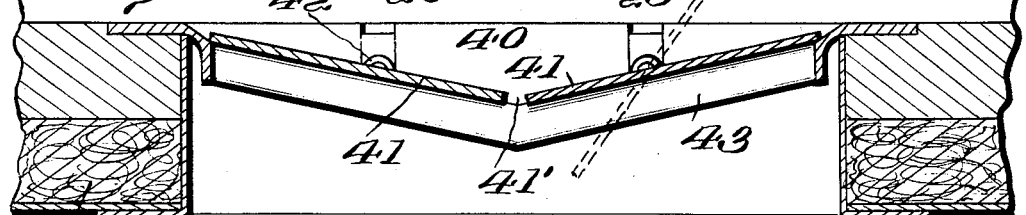
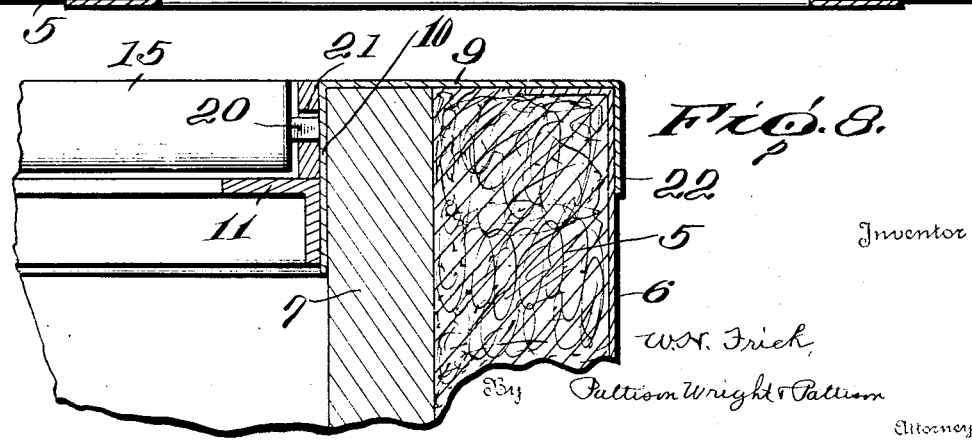

Oct. 19, 1937.  W. H. FRICK  2,096,631
CONVERTIBLE GAS AND CHARCOAL RANGE
Filed Nov. 7, 1934  7 Sheets-Sheet 6
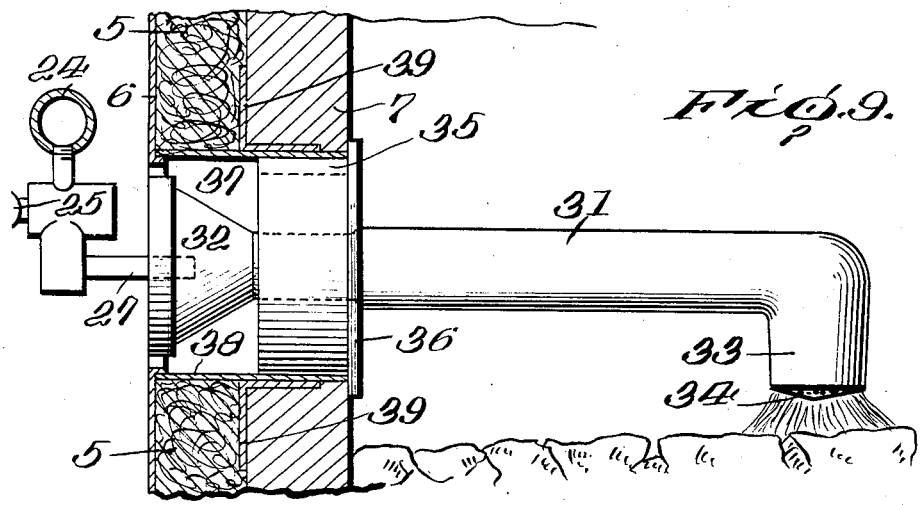
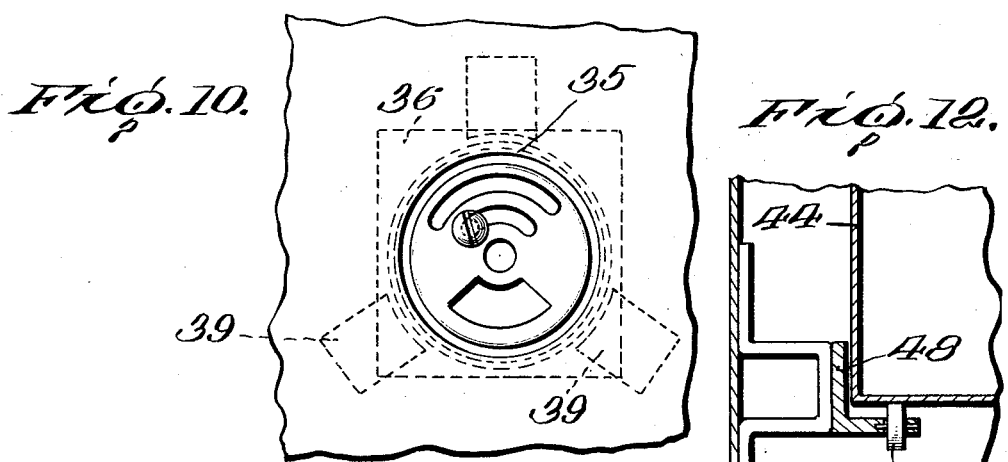
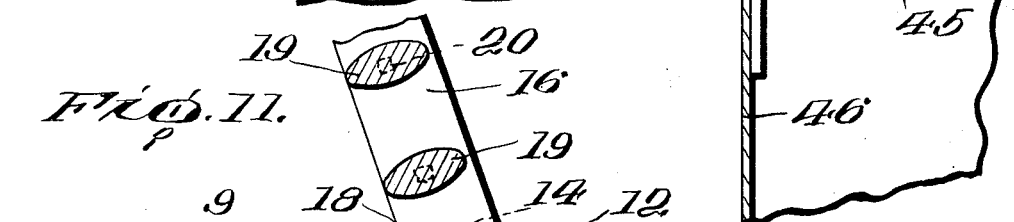
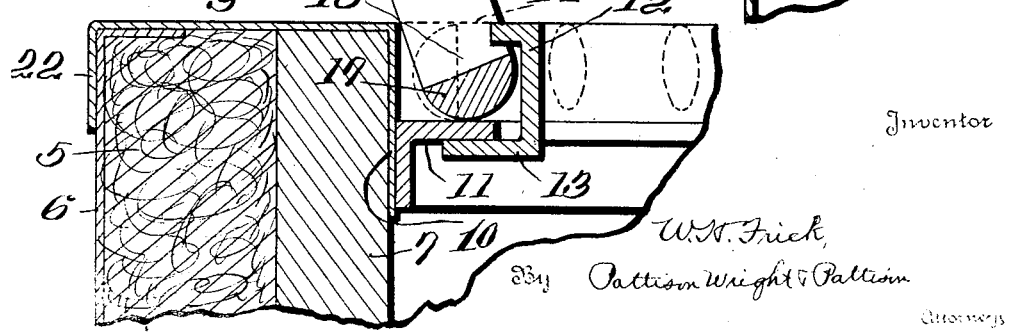
Inventor
W. H. Frick,
By Pattison Wright & Pattison
Attorneys Oct. 19, 1937.  W. H. FRICK  2,096,631
CONVERTIBLE GAS AND CHARCOAL RANGE
Filed Nov. 7, 1934   7 Sheets-Sheet 7

Inventor
W. H. Frick
By Pattison Wright & Pattison
Attorneys

Patented Oct. 19, 1937

2,096,631

UNITED STATES PATENT OFFICE 2,096,631

CONVERTIBLE GAS AND CHARCOAL RANGE

William H. Frick, Cleveland, Ohio, assignor to American Stove Company, St. Louis, Mo., a corporation of New Jersey Application November 7, 1934, Serial No. 751,937

2 Claims. (Cl. 126—36)

This invention relates to improvements in a convertible gas and charcoal range and the broad object is to produce a range which is specially constructed with a compartment which receives charcoal to enable the range to be used as a charcoal range.

A further object of the present invention is to enable anyone owning this range to use charcoal for broiling fish, steaks and other meats, thereby giving to that being broiled the delightful aromatic "tang" that can only be produced by a charcoal fire, and which enables anyone to obtain the same effect as is obtained by camp fires.

Other objects of the invention pertain to certain details of construction which will be pointed out hereinafter whereby the range structure can be used as a charcoal burning range.

Fig. 6 is a horizontal cross sectional view taken on a line between the said grids and gas burners.

Fig. 7 is a vertical sectional view showing the ash drops, the rest of the range being omitted.

Fig. 8 is a transverse sectional view through one end of the grid dotted line 8—8 of Figure 5, the insulated portion at one side of the grid and the removable metal top partially enclosing said insulation.

Fig. 9 is a vertical sectional view of that part of the range which receives the removable charcoal gas igniter.

Fig. 10 is a front elevation of that part shown in Fig. 9.

Fig. 11 is a vertical sectional view taken through one corner of the top of the range showing part of the said grid in a position to be removed from the structure.

Fig. 12 is a vertical sectional view through one part of the ash receiving pot or drawer showing one form of supporting the same so that it can be removed when it is desired to empty said drawer of its contained ashes.

For the purpose of enabling the present invention to be understood the gas range which involves the present invention will be first described and then the special construction of the said range adapting it to use charcoal having the advantages referred to in the objects of the invention.

Figure 1:
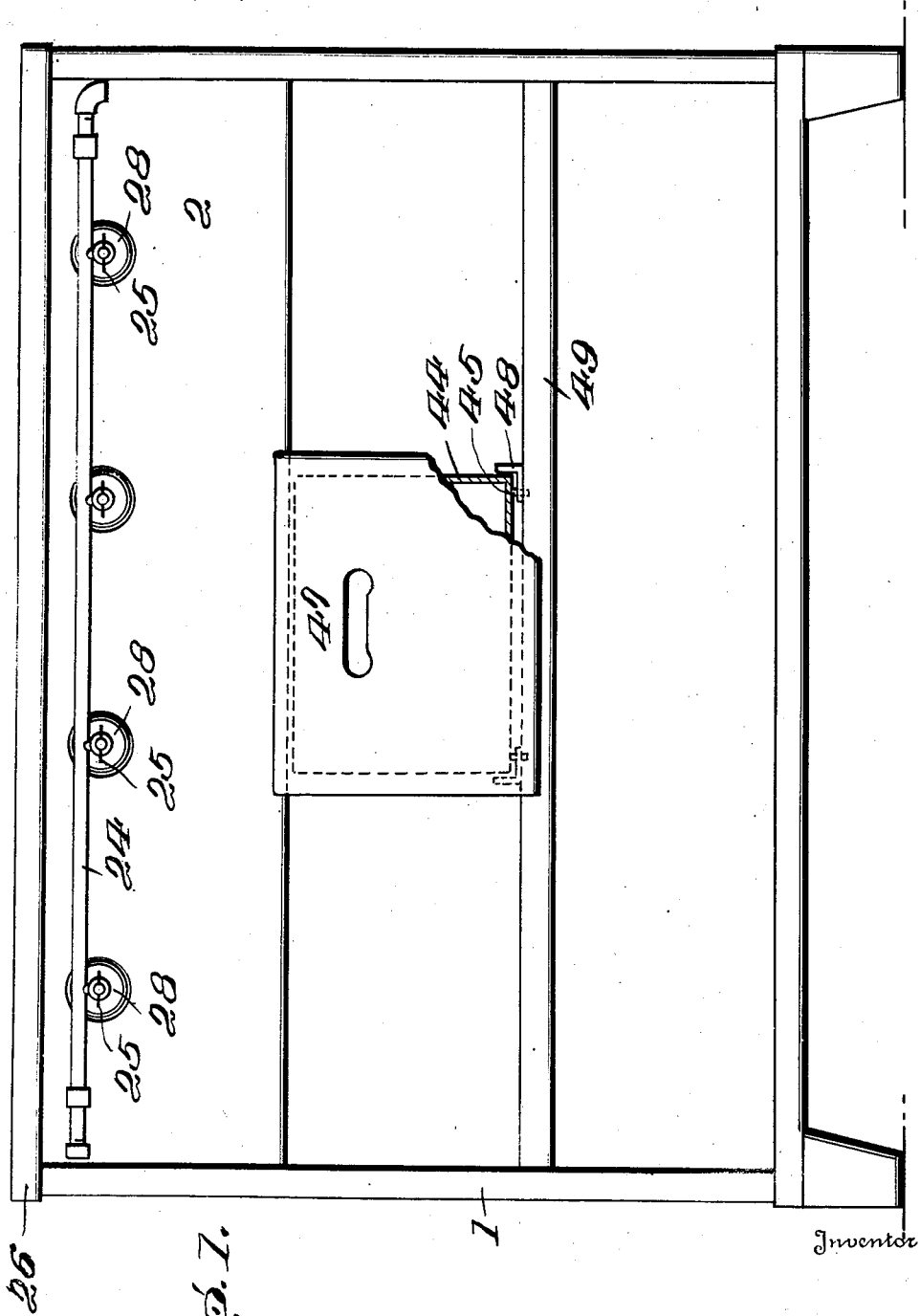
Figure 1 is a front elevation of a gas range constructed to be used as a charcoal range.
Figure 2:
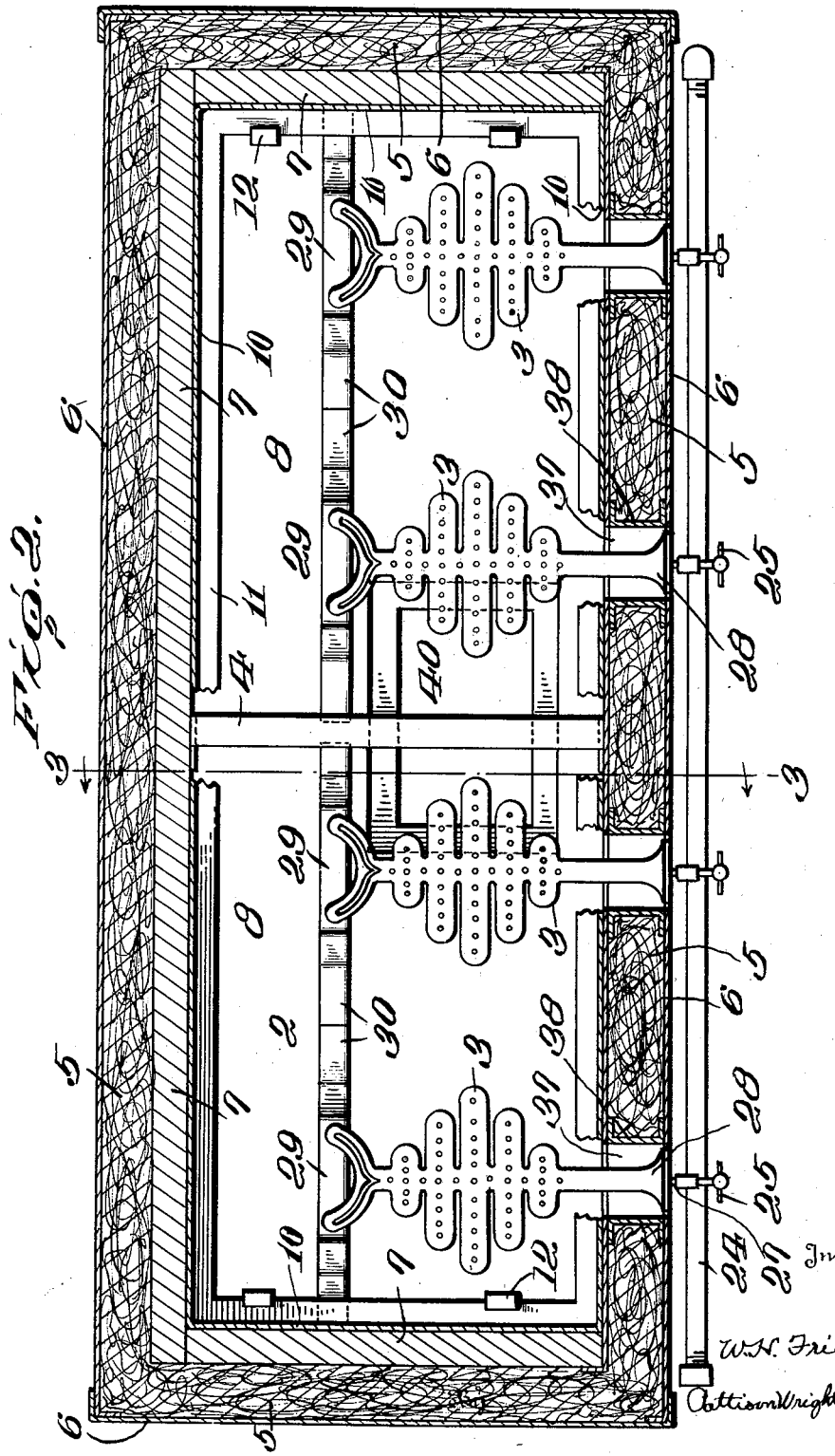
Fig. 2 is a horizontal sectional view taken between the grids and the gas burners.
Figure 3:
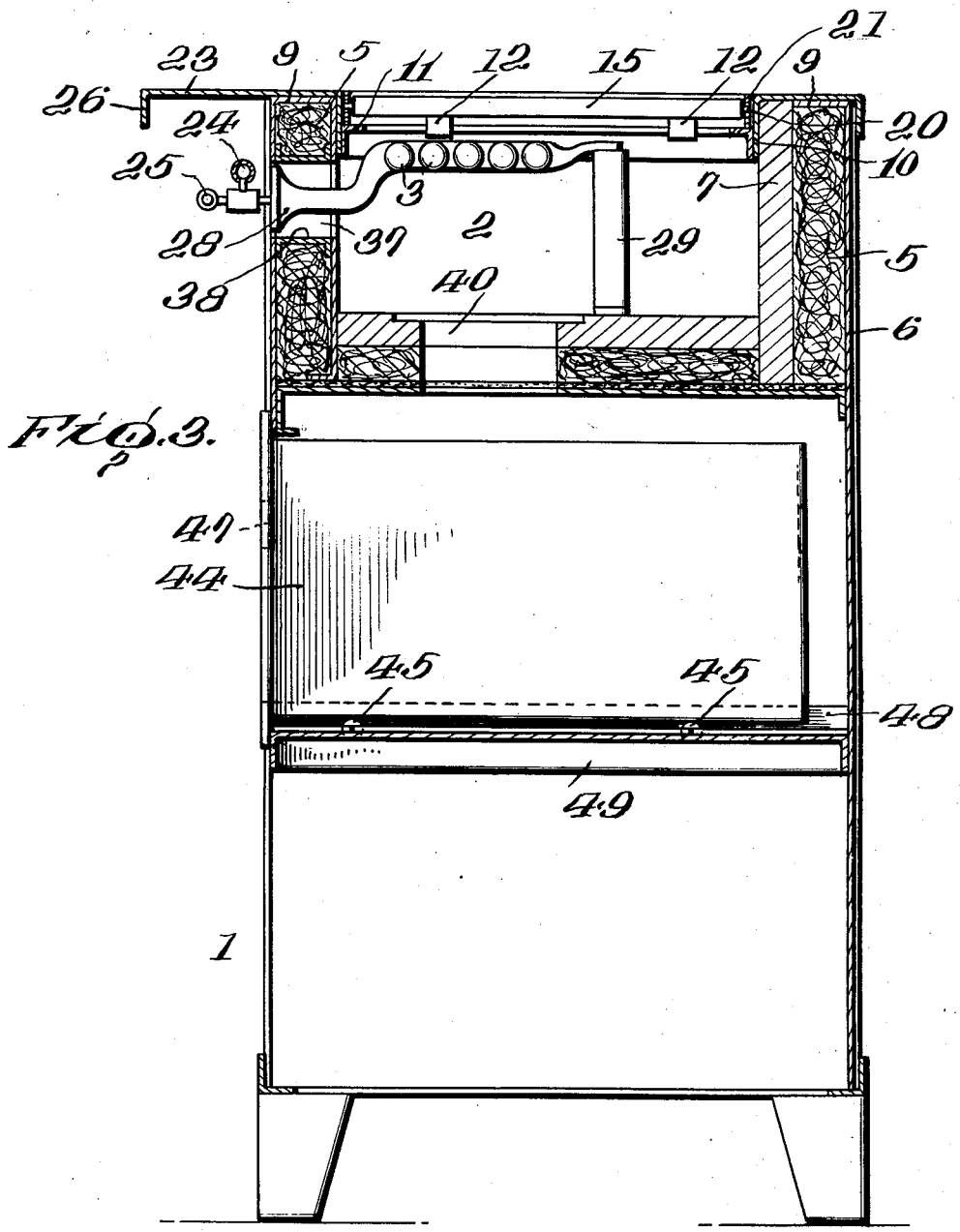
Fig. 3 is a transverse vertical sectional view taken on the line 3—3 of Fig. 2 looking in the direction indicated by arrow.
Figure 5:
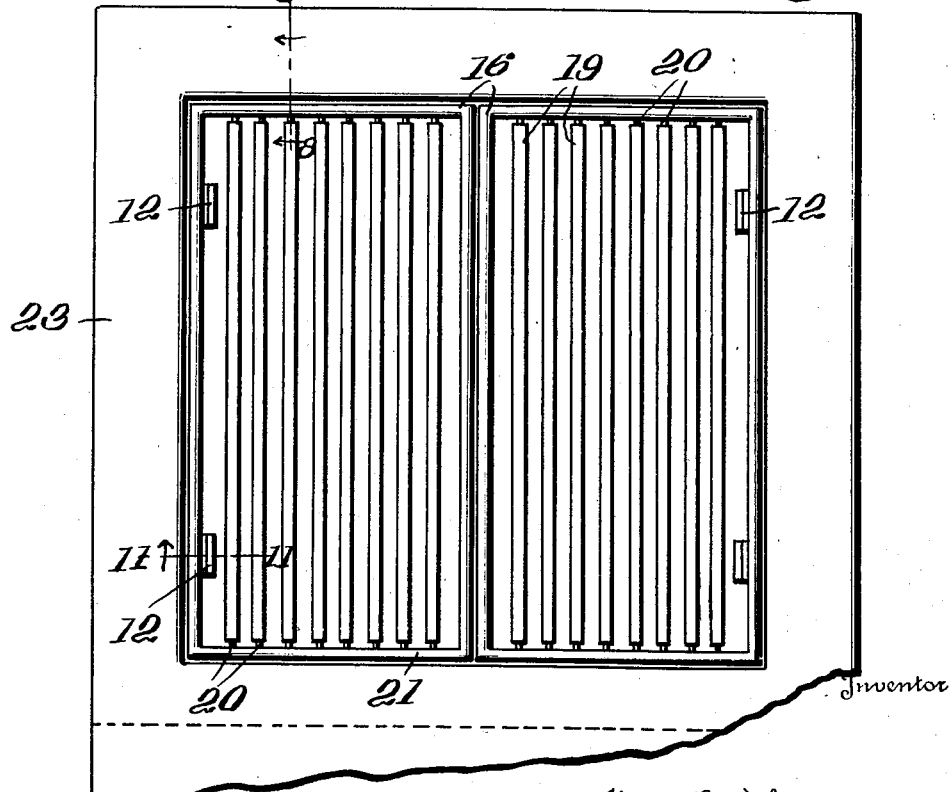
Fig. 5 is a top plan view showing the grids in operative position.
Figure 13:
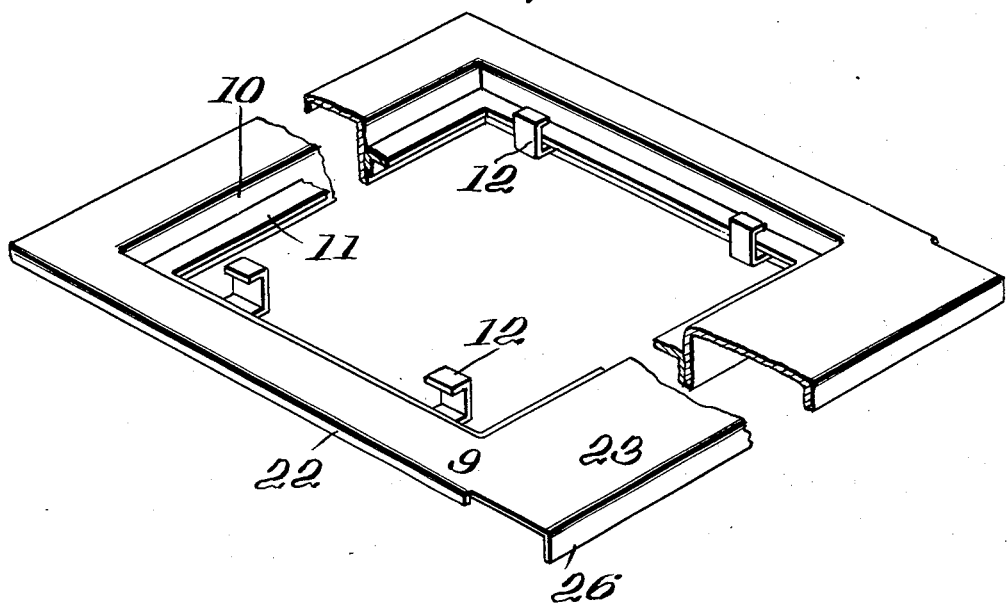
Fig. 13 is a detached perspective view of the removable metal top of the said range which is shown broken between its ends.

Referring now to the drawings, 1 indicates a rectangular frame which has at its top a compartment 2 which is adapted to receive a removable gas burner 3. In Figures 1 and 2 the said range is shown provided with two compartments 2 which is provided with a vertical intermediate partition 4. In Figure 2 each compartment is provided with two burners whereas in Figure 6 each compartment is provided with a single burner. This is merely a question of size and the invention can be carried out in a structure which varies the size of the range. Both types of ranges here shown have a surrounding insulated portion 5 which is common in ovens and is for the same purpose as in other ovens, of holding the heat therein and preventing the heat from being conducted to the surrounding atmosphere. The outer wall is made of suitable metal 6 and the inner wall is preferably composed of suitable refractory material 7. Also the bottom 8 of said compartments is likewise composed of a suitable refractory material. The top 9 of the range is composed of metal preferably of the stainless type and it is made in plan view of a form to fit the said range. The form here shown is rectangular. This top 9 has its inner edge 10 extending down into the said compartment 2 and has connected to its lower edge a suitable L-shaped member 11, said member serving to strengthen the metal top 9 which is usually formed of relatively thin sheet metal. Attached to each side of the member 11 are U-shaped hinges 12 which have their lower leg 13 welded to the horizontal leg of the L-shaped member 11. The upper leg of the member 12 is made shorter than the lower leg 13 and it forms openings 14. The grid 15 is composed of two rectangular frames 16 (Fig. 5) which grids have one edge 17 cut out as shown at 18 where the members 12 meet the said grid. The object of this construction is to enable the grid to be turned in an upward position as shown in Figure 11 for the purpose of opening up the upper end of the said compartment 2 thus enabling the gas burner or burners 3 to be removed from said compartment and a suitable amount of charcoal placed in said compartment. Also these notches enable the said grids to be entirely removed when it is desired. In Figure 5 these grids are preferably composed of two rectangular frames 16 for the purpose of convenience in handling them. A plurality of grid members 19 extend in a direction preferably transverse the said compartments 2 and these are provided with ends 20 that enter holes in the frame 16. These members 19 have their ends 20 preferably rectangular in shape and they fit in correspondingly shaped openings in the frame 15. These grid members 19 are made oblong in cross section and are arranged in the position shown in Figure 11 so that they will always remain in that position. This is for the purpose of enlarging the spaces between them. Attention is directed to the fact that the pivotal ends 20 are made of such a length as to leave a suitable space 21 between their inner ends and the corresponding ends or walls of the frames 16. This is for the purpose of enabling the members 19 to expand or contract in respect to the surrounding frame 16 under the heat to which they are subjected and when they are cool. These members 19 carry enough metal so that they expand and contract under the different temperatures to which they are subjected without in any manner warping the surrounding frame 16. These rectangular ends 20 therefore are loose in their respective holes. By reference to Figures 8 and 11 it will be observed that the top 9 has its outer edge 22 bent down and lapping over the outer wall 6 that encloses the insulating material. The outer edge 23 of the member 9 extends forward from the manifold 24 and gas valve 25 and has its outer edge 26 extending downwardly.

Figure 14:
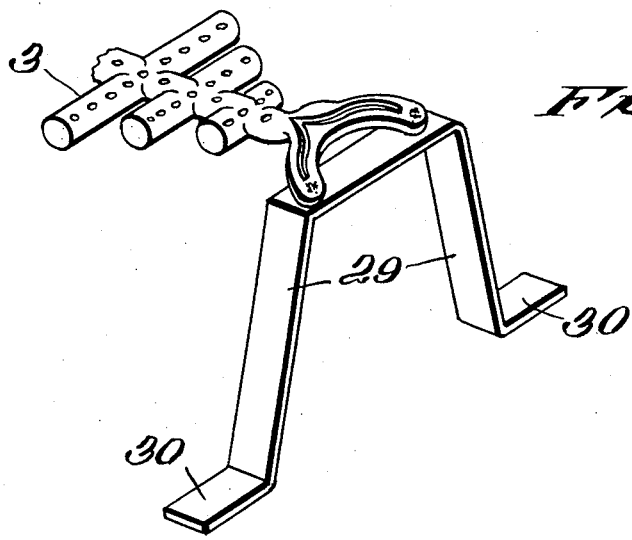
Fig. 14 is a detached perspective view of the inner end of one of the removable gas burners which carries its support.

When the range is to use gas for its cooking the gas burners 3 are placed in the position shown in Figures 1, 2 and 6. In this position the outer end is supported by the nipple 27 which passes in an opening formed in the outer end 28 which is the gas and air mixing chamber while its inner end is supported by a member 29 which is welded or cast or otherwise carried by said inner end. This member as shown in Figure 14 is essentially an inverted U-shaped member and has its lower ends 30 resting upon the bottom 8 of the compartments 2. When however charcoal is to be substituted for the gas burners these gas burners are removed from the compartments 2, by lifting the said grid upward as in Figure 11, and an igniter 31 for the charcoal has its mixing end 32 placed in contact with the said nipple 27. This igniter has its inner end turned downward at right angles to the body portion as shown at 33 and carries a perforated or other member 34 through which the gas flows from the manifold and when lighted the flame projects downward in contact with the charcoal within the compartment 2. The charcoal is thereby lighted by the flame from the igniter. This igniter is supported in the position shown in Figure 9 by a collar 35 which extends inwardly from a member 36 that is cast as a part of the igniter 31 or otherwise connected with said igniter. This member 36 is made larger than the opening 37 through which the mixing member 32 passes so that the igniter is properly placed by pushing it in said opening 37 until the member 36 engages the inner end of the said opening.

This igniter carries a mixer 32 of its own, and also the mixers 28 of the gas burners are carried by the said gas burners and are separate from the mixers 32.

In Figure 10 the metal wall 38 for the opening 37 is provided with arms 39 which engage with the insulation 5 and serve to support said wall 38 permanently in position.

When charcoal is being used as the fuel it is necessary to provide some means for cleaning out the compartment 2 of the charcoal ashes. For this purpose the compartment is provided with an opening 40 in its bottom and said opening is preferably located at the front of the said compartment. This opening is provided with one or more pivoted doors 41 suitably pivotally supported at 42. These pivots are connected with a member 43 that surrounds the inner end of the said opening. These doors are so pivoted that they normally are in closed position. When it is desired to remove the ashes from the compartment 2 then the inner ends of these doors are pushed on and openings are formed through which the ashes can be readily removed. Also for the purpose of convenience in removing these ashes, I provide a drawer or other receptacle 44 which is located under the said opening 40. This drawer catches the ashes that pass through the opening 40 and the drawer is preferably supported on suitable rollers 45 which are supported by the wall 46 in any desired manner. From the foregoing construction it is only necessary to pull the drawer outward by means of its handle 47 and the ashes carried to any desired point.

Figure 4:
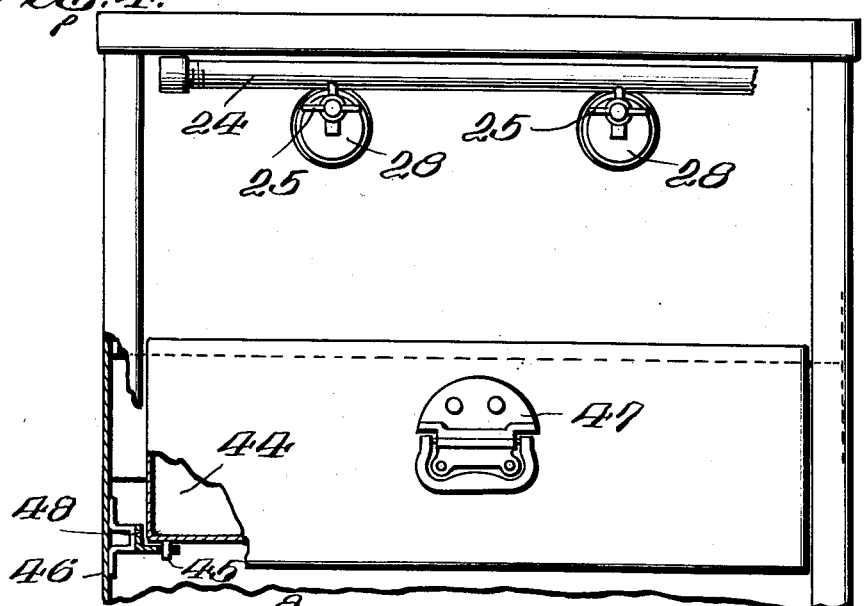
Fig. 4 is a front elevation of a modification of the structure shown in Figs. 1 and 2.

A modification of the said drawer 44 is shown in Figure 4. This modification relates not to construction but only to dimension. In said Figure 4 it is made of such dimension as to extend across the whole front of the range. It is supported on rollers in the same way as explained in connection with Figures 1 and 12. As shown in Figure 12 the roller 45 is suitably supported by the wall 46. As shown in Figure 1 the roller 45 is supported by a cross member 48 supported to a horizontal bar 49.

I desire it understood that detailed modifications may be made in the structures described without departing from the spirit and scope of the claims.

Very little air is necessary for the combustion of charcoal, and this air passes through the slot 41' to the charcoal above and spreads sufficiently throughout the charcoal to provide the necessary air for combustion. Should coke be used, it would be understood that the amount of air will be increased by increasing the size of the slot 41'. Attention is especially directed to the fact that the range is provided with a compartment 2 which is constructed to receive and support a bed of charcoal as shown in Figure 9, and attention is further directed to the specially constructed igniter 31, 33 and an inverted burner 34 that is located above the said charcoal bed and directs a flame downward on top of the charcoal for causing the same to burn.

I claim:

1. A gas range convertible into a charcoal burning range comprising a compartment adapted to contain the charcoal, the upper end of said chamber having an open grid, the outer wall of said chamber having an enlarged opening passing therethrough, and a gas conveying tube passing through the said enlarged opening and with its outer end where it passes through the said opening provided with an enlarged member removably engaging the wall of the said enlarged opening, the inner end of the tube extending substantially to the center of the said chamber and having its open end bent downwardly and adapted to deliver an igniting flame downwardly on said charcoal, whereby the said igniter is adapted to removably fit into the said opening made in the wall and whereby the said structure can be converted into a charcoal burner, for the purposes herein set forth.

2. A gas range having a chamber adapted to receive charcoal, the upper end of the chamber provided with an open grid, the side wall of the said chamber provided with an enlarged opening adapted to receive the outer end of an inwardly extending gas conveying tube having its inner open end extending downward and delivering a flame directly against the top of said charcoal, the opening in the wall of the chamber being adapted to receive and support either the outer end of the said tube or receive the outer end of a gas burner tube, the outer end of the said igniter having enlarged means adapted to engage the wall of the said opening whereby the stove is readily convertible from a gas to a charcoal burner, for the purpose herein set forth.

WILLIAM H. FRICK.